United States Patent [19]

Nieminen et al.

[11] 4,311,670
[45] Jan. 19, 1982

[54] FLUIDIZED BED REACTOR SYSTEM

[75] Inventors: Jorma J. Nieminen, Varkaus; Engström Folke, Karhula, both of Finland

[73] Assignee: A. Ahlstrom Osakeyhtio, Noormarkku, Finland

[21] Appl. No.: 109,604

[22] Filed: Jan. 4, 1980

Related U.S. Application Data

[60] Division of Ser. No. 970,457, Dec. 18, 1978, Pat. No. 4,244,779, which is a continuation-in-part of Ser. No. 820,575, Aug. 1, 1977, abandoned.

[30] Foreign Application Priority Data

Sep. 22, 1976 [FI] Finland .................................. 762695
Feb. 21, 1977 [FI] Finland .................................. 770546
Apr. 20, 1977 [FI] Finland .................................. 771247

[51] Int. Cl.³ .............................. B01J 8/24; B01J 8/32
[52] U.S. Cl. .......................................... 422/145; 34/10; 34/57 A; 422/146; 422/147; 422/143
[58] Field of Search ............... 422/142, 145, 144, 147, 422/185, 214; 201/31; 48/203, 206; 34/10 R, 57 A; 432/14, 16

[56] References Cited

U.S. PATENT DOCUMENTS

| | | | |
|---|---|---|---|
| 2,503,788 | 4/1950 | White | 422/145 |
| 3,309,262 | 3/1967 | Copeland et al. | 422/185 |
| 3,912,465 | 10/1975 | Kunii et al. | 422/142 |
| 4,002,535 | 1/1977 | Albright et al. | 201/31 |
| 4,104,129 | 8/1978 | Fields | 201/31 |

*Primary Examiner*—Michael S. Marcus
*Attorney, Agent, or Firm*—Bucknam and Archer

[57] ABSTRACT

A fluidized bed reactor where material from a prereactor is brought into contact with hot particles separated from flue gases. The particles when removed from the flue gases by a separator are passed to a prereactor having a gas supply and vapor removal port where the hot particles are mixed with fresh feed material and the mixture is passed to the fluidized bed reactor for chemical and/or thermal treatment.

2 Claims, 7 Drawing Figures

FLUIDIZED BED REACTOR SYSTEM

This is a division of application Ser. No. 970,457, filed Dec. 18, 1978, now U.S. Pat. 4,244,779 which was a continuation-in-part of Ser. No. 820,575 filed Aug. 1, 1977, now abandoned.

BACKGROUND OF THE INVENTION

1. Field of the Invention

The present invention relates to the treatment of materials in a fluidized bed reactor and particularly to the treatment of various sludges, spent liquors from pulping processes and other combustible materials.

2. Description of the Prior Art

It is well known that a fluidized bed reactor can be used for the incineration of various materials. The material is introduced into the bed of the reactor where it comes into contact with the hot fluidized particulate bed material. As an example of such an application the U.S. Pat. No. 3,319,586 can be cited, which describes incineration of waste sludges containing organic matters. Because of the high water content of these sludges after the mechanical dewatering process, the incineration of the sludges in a fluidized bed reactor involves problems.

By mechanical treatment it is, for instance, possible to remove so much water from sewage sludge that its solids content is about 20%. If appropriate chemicals are added to the sludge such as e.g. lime and ferrochloride a solids content of about 45% can be achieved, whereby the combustion in a fluidized bed reactor will be autogeneous. If the solids content is lower, it is necessary to supply the reactor with auxiliary fuel in order to maintain combustion. From most industrial waste sludges it is possible to remove only so much water by mechanical means that the solids concentration will be lower than 20%. Incineration of such sludges causes high operating costs, which increase with the moisture content.

In order to improve the thermal economy of the incineration process, the heat of the combustion gases can be utilized for predrying the sludge either by direct or indirect heat transfer. In the direct method the combustion gases are brough into direct contact with the sludge and the exhaust gases will therefore contain malodorous gases. As the volume of the gas is large, the burning of the smelling components will cause considerable expenses. In the indirect method large heat transfer surfaces are needed, which causes high construction costs.

Canadian Pat. No. 524,796 shows an example of a method where the sludge is predried by contacting it with the combustion gases.

Earlier, the chemicals in spent liquors from the sulphate pulping processes have usually been recovered by burning the spent liquors in a recovery boiler, whereby sodium and sulphur contained in the digestion chemicals are recovered from the smelt in the form of sodium carbonate and sodium sulphide. The sodium carbonate is then converted into sodium hydroxide by causticizing the dissolved smelt. The combustion of the spent liquor takes place in three stages: drying, reducing combustion and oxidizing combustion. Because of this it is difficult to control the different stages carried out in the same space, in such a way that the desired result will be achieved. This arrangement is too expensive for small pulp mills. A steam boiler is moveover not fully realizable in operation because it is subject to many disastrous boiler explosions.

The chemicals in the spent liquors coming from a sulphite pulping process can be recovered for instance as described in the Finnish Pat. No. 45,880 where the carbonate and the sulphide sulphur in the green liquor obtained from the smelt coming from the recovery furnace are separated, and the sulphide-containing solution is reacted with a bisulphite solution whereby the released hydrogen sulphide is converted by combustion into dioxide. The sulphur dioxide from the combustion process is reacted with a carbonate water solution in an absorption tower whereby bisulphite needed for the pulping liquor is formed.

Pyrolysis has been used for recovery of digestion chemicals from spent liquors, for instance in the SCA-Billerud process, where the sodium salts in sodium sulphite spent liquors are converted into sodium carbonate and the sulphur components into hydrogen sulphide. The hydrogen sulphide is converted by combustion into sulphur dioxide and absorbed into a sodium carbonate solution. This method is described in the Finnish Pat. No. 45 518.

It has also been proposed to treat the spent liquor in a rotating furnace. U.S. Pat. No. 3,787,283 describes a method for recovering chemicals, where a concentrated spent liquor from a sodiumbased pulping process is mixed with reactive alumina hydrate and formed into solid pellets by adding sodium aluminate. The pellets are fed into a rotating furnace where a temperature below the fusion temperature of sodium aluminate is maintained. A portion of the resulting sodium aluminate ash is dissolved in water and the solution is reacted with the sulphur dioxide-containing flue gases to form a slurry containing sodium sulphite, from which aluminum hydrate is separated. The remaining portion of the sodium aluminate ash is recycled and mixed into the spent liquor.

The operation of a rotating furnace involves several disadvantages. It is expensive and requires a great deal of maintenance. Its thermal economy is unsatisfactory because it is necessary to supply auxiliary fuel for maintaining the temperature required for the reaction. The heat transfer from the gas in the furnace to the treated material is, as is well known, poor. The furnace must therefore be large-sized. In order to reduce the dust losses the material has to be formed into pellets, for which reason auxiliary apparatuses are required before the furnace as well as after it. As a consequence of the pelletizing the solids content of the material supplied to the furnace must be high, which increases the operation costs.

It has also been proposed to incinerate spent liquors in fluidized bed reactors. As an example of an application of this kind, U.S. Pat. No. 3,635,790 can be cited. Because the combustion temperature has to be lower than the fusing temperature of the chemicals, for instance maximally 750° C., when incinerating spent liquors containing sodium the combustion has to be performed within a temperature range where it is difficult to maintain stable combustion. The temperature can be reduced by feeding to the furnace a liquor which has a low solids content or by cooling the process with a great amount of excess air. In both cases the furnace has to be large-sized and is difficult to control.

Gasification of solid organic material has earlier been performed, for instance, by a method disclosed in U.S. Pat. No. 3,840,353, wherein a granulated carbon-containing fuel is introduced into a fluidized bed reactor and solid particles removed from the flue gases are returned to it. The combustion and the gasification of the carbon-containing material is brought about in the same reactor, for which reason it is difficult to control the reactions in a desired manner.

In order to avoid the aforesaid disadvantages, it has been proposed to subject the material to be treated to contact with hot material taken from the bed of the reactor before it is introduced into the fluidized bed reactor. A method of this kind is described in the German patent application No. 2 532 994. One of the drawbacks of the arrangement is that the hot bed material has to be transferred from the reactor and back to it and another drawback are the control problems connected with it when the quantity or the moisture content of the material to be treated changes. The wear of bed material and equipment also causes problems. Because thermal energy for evaporation of moisture in the material is taken from the bed, a corresponding amount of heat has to be transferred to it, i.e. the combustion must take place in the bed which therefore has to be of large volume. The supply to the bed must furthermore be distributed among several ducts, which will increase the construction costs.

The exhaust gases from the combustion chamber of a fluidized bed reactor contain fine material which can be separated, for instance in a cyclone separator. The fine material contains ash, fine particles from the bed material and usually also usable chemicals. Its heat content is considerable. Depending on the velocity of the air flowing through the fluidized bed reactor, it will function differently. The higher the velocity is, the greater is the fluidized bed material entrained in the uprising fluidizing air and the more fine solids will be exhausted with the flue gases.

SUMMARY OF THE INVENTION

According to the invention, the material to be treated is subjected to contact with fine particles separated from the flue gases exhausted from the fluidized bed reactor, which are mixed with the material before it is introduced into the reactor. In this connection also chemical and/or thermal reactions can occur. Useful components can be recovered from the gases and vapors generated in connection with this treatment by known methods. The fluidized bed reactor is operated in such a way that the velocity of the air flowing through the reactor is between 1 and 10 m/s.

The advantages of the method of this invention in comparison with the fluidized bed technique of the prior art are as follows:

The new method requires markedly less energy as auxiliary fuel for burning wet sludges than the prior method at fluidized bed processes.

The volume of the flue gases in the new method is about 50% of the volume of the flue gases in the prior art fluidized bed processes. Consequently the size of the fluidized bed reactor and the gas cleaning equipment will be much smaller.

The mixing conditions in the new method are much better than in the prior art fluidized bed processes. Consequently the combustion density will be higher and the volume needed is smaller.

Due to the smaller size of the fluidized bed reactor and the more efficient mixing, it is easier to feed the material to be treated into the reactor. Especially the feeding of peat involves problems and high costs in the prior art fluidized bed processes.

Due to the radiating properties of the recycled particles, the combustion is stable also at low temperatures. The stabilizing influence of the recycled particles also contributes to stabilize the combustion.

Because the water in the material to be treated is evaporated before the combustion process, the combustion temperature will increase and because of the high heat transfer properties of the fluidized bed material the heat transfer surfaces for steam generation will be smaller.

The pressure losses in the fluidized bed reactor and the required power for the blower are smaller.

The new method makes it possible to use the evaporation heat for heating purposes.

The fluidized bed reactor in which the new method is adapted is easily controllable.

It is therefore an object of the present invention to provide a method for treating materials in a fluidized bed reactor which avoids the above mentioned disadvantages.

Another object of the invention is to provide a method for the incineration of various sludges.

A further object of the invention is to provide a method for treating spent liquors coming from pulping process in order to recover the pulping chemicals in the spent liquors.

Another object of the invention is to provide a method for the treatment of spent liquor from pulping processes based on Ca or other alkali metals.

An additional object of the invention is to provide a method for thermal decomposition of organic materials in order to obtain raw gases containing carbon monoxide, hydrogen and hydrogen sulphide.

The method of this invention is applicable to the combustion of coal and to the calcination of calcium carbonate.

DESCRIPTION OF THE DRAWINGS

The invention is described in more detail below with reference to the enclosed drawings in which.

DESCRIPTION OF THE PREFERRED EMBODIMENTS

Figure 1:
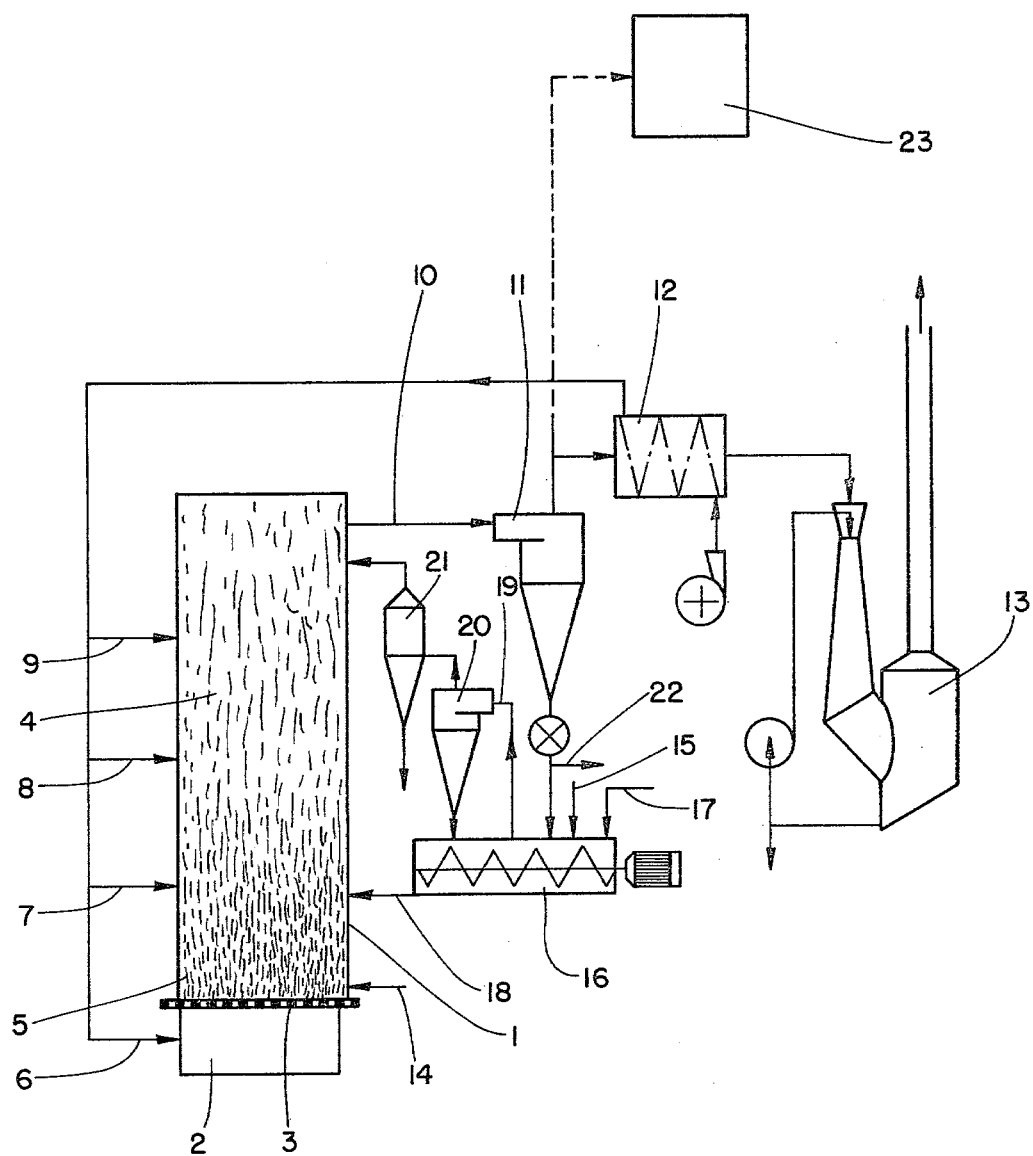
FIG. 1 is a flow sheet of the method of the present invention as adapted for the incineration of sludges.

In FIG. 1, there is shown a system for the incineration of sludges, in which the numeral 1 refers to a fluidized bed reactor comprising a windbox 2, a constriction plate 3 and a combustion chamber 4. Above the constriction plate there is bed material 5 which is fluidized and entrained by air supplied to it through the constriction plate. Air for fluidization and combustion is supplied to the windbox through conduit 6. Auxiliary combustion air is supplied to the combustion chamber through conduits 7, 8 and 9. The combustion gases and other gases generated by chemical reactions are exhausted from the reactor through conduit 10 from which the flue gases flow to a dust separator 11, a preheater for the air 12, and a gas scrubber 13. In case of need auxiliary fuel can be supplied to the reactor through conduit 14. Bed material can be added through conduit 15 into a prereactor 16.

Gas entrained solids are removed from the flue gases in the dust separator and conducted to the prereactor where they are brought into contact with the sludge applied through conduit 17. The mixer is provided with two agitator screws which rotate in opposite directions and in this manner bring about an effective mixing of the sludge with the hot particles while conveying it to the end of the prereactor, wherefrom it is discharged to the reactor through conduit 18. In the prereactor preheating and drying of the sludge is brought about, in which connection vapor is generated, which is passed through conduit 19 to a dust separator 20 and further to a condenser 21. Condensed liquid is discharged from the lower part of the condenser, for instance to a water purification plant, and non-condensable gases are discharged from its upper part and passed to the reactor to be burned because they contain malodorous components. A portion of the particles removed by the dust separator is discharged through conduit 22 to control the quantity of the recycled material.

When the system illustrated in FIG. 1 is used for the gasification of moist organic material, the moist material 17 is supplied to the preheater 16 where hot particles separated in the dust separator 11 are mixed into it. Water evaporates and is discharged together with possible evaporated combustible components to the dust separator 20, where dust is separated from the gases. From the separator, the gases flow to the condenser 21 where the most part of the steam condenses. The remaining part of the gases is conducted to the fluidized bed reactor 1. The dried combustible material and the particles which have been used for heating purposes are introduced into the fluidized bed reactor, where the combustible material is partly combusted and the uncombusted portion 10 is exhausted mainly in gaseous state, through the cyclono separator 11 to the plant where they are used, e.g. a steam boiler. The combustion gases produced in this way have a considerably smaller content of inert gases than they would have had if the combustible material had been supplied in a moist state to the fluidized bed because the water has been removed from the material before the actual gasification is brought about. If the material had been dried directly by hot gases, a part of the combustible components would have been discharged with the drying gases. The generated combustible gases are thus of better quality and furthermore produced by simple means.

Figure 2:
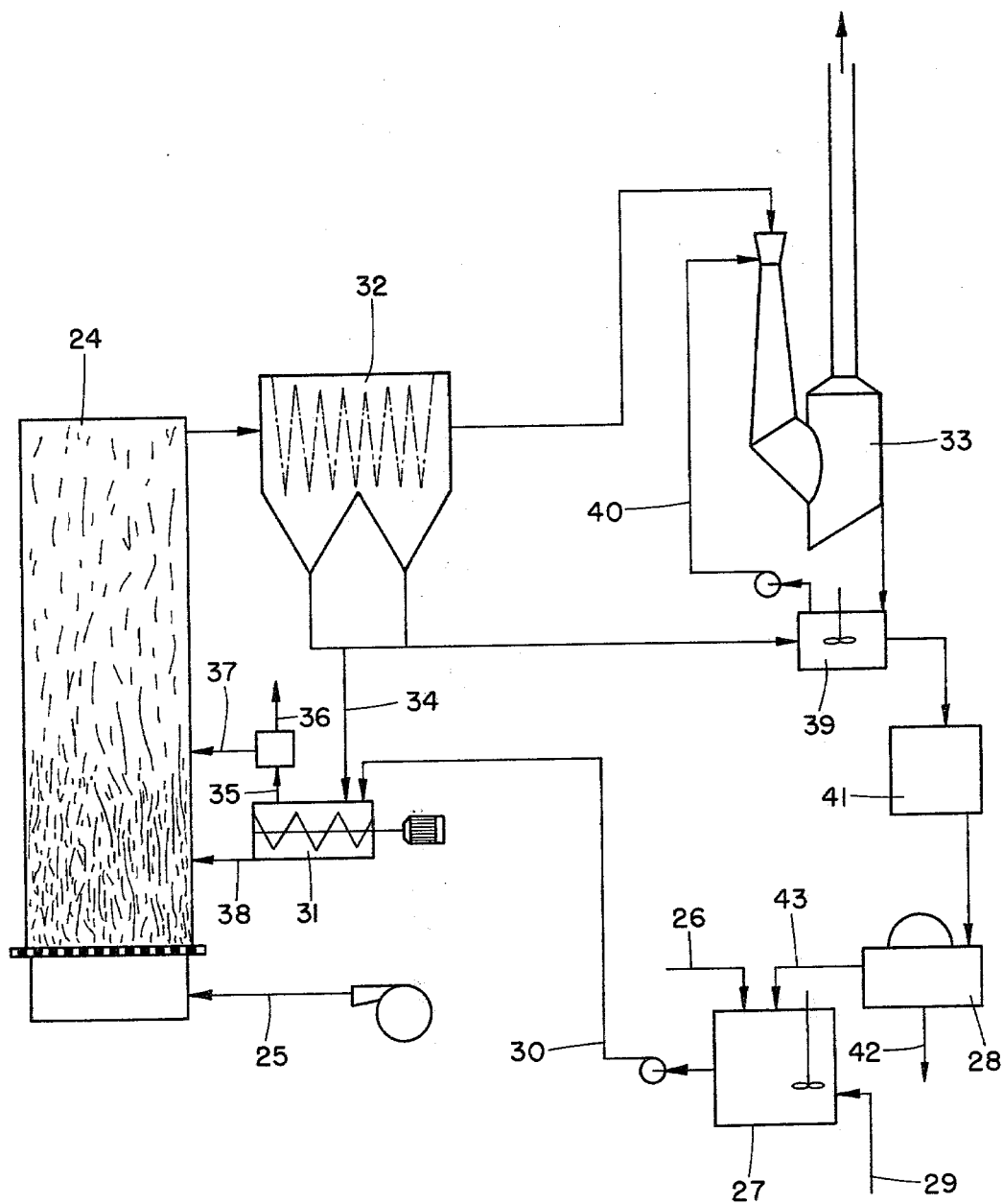
FIG. 2 is a flow sheet of the method as applied to spent liquors from a sodium based pulping process, where sodium is recovered in the form of $Na_2CO_3$.

In FIG. 2, there is shown a system for the recovery of chemicals from spent liquors coming from a NaOH- based pulping process, where sodium is recovered in the form of a $NaCO_3$ -containing liquid from which a digestion liquor is obtained by causticizing.

In FIG. 2, the numeral 24 refers to a fluidized bed reactor, which is supplied with air for fluidization and combustion through conduit 25. The spent liquor is introduced through conduit 26 into a mixer 27 to which also alumina hydrate separated in the filter 28 is conveyed, and through conduit 29, reactive $Al(OH)_3$ as make-up chemicals. The alumina hydrate reacts partly with the sodium in the spent liquor forming sodium aluminate compounds which through conduit 30 are supplied as a sludge having a solids content of 30 to 70% to a prereactor 31. The heat of the flue gases discharged from the upper part of the reactor is utilized for producing steam in a waste heat boiler 32, from which they flow to a gas scrubber. A portion the dust in the flue gases, cooled down to 300° C., settles to the bottom of the waste heat boiler, from which it is conducted through conduit 34 to the prereactor 31, and another portion thereof is removed in the gas scrubber.

A portion of the sodium aluminate-containing dust removed from the flue gases in the waste heat boiler 32 is delivered to a dissolver 39. From the dissolver sodium aluminate slurry is fed to the gas scrubber 33 where it reacts with carbon dioxide in the flue gases, which neutralize it to a pH-value of 9, whereby $Al(OH)_3$ precipitates. From the dissolver the slurry is transmitted via an aging tank 41, where alumina hydrate crystallizes, to the filter 28 where aluminium hydrate is filtered out from the dissolved sodium salt. The sodium-containing solution is delivered through conduit 42 to the digestion liquor preparation plant and the alumina hydrate through conduit 43 to the mixer 27.

Figure 3:
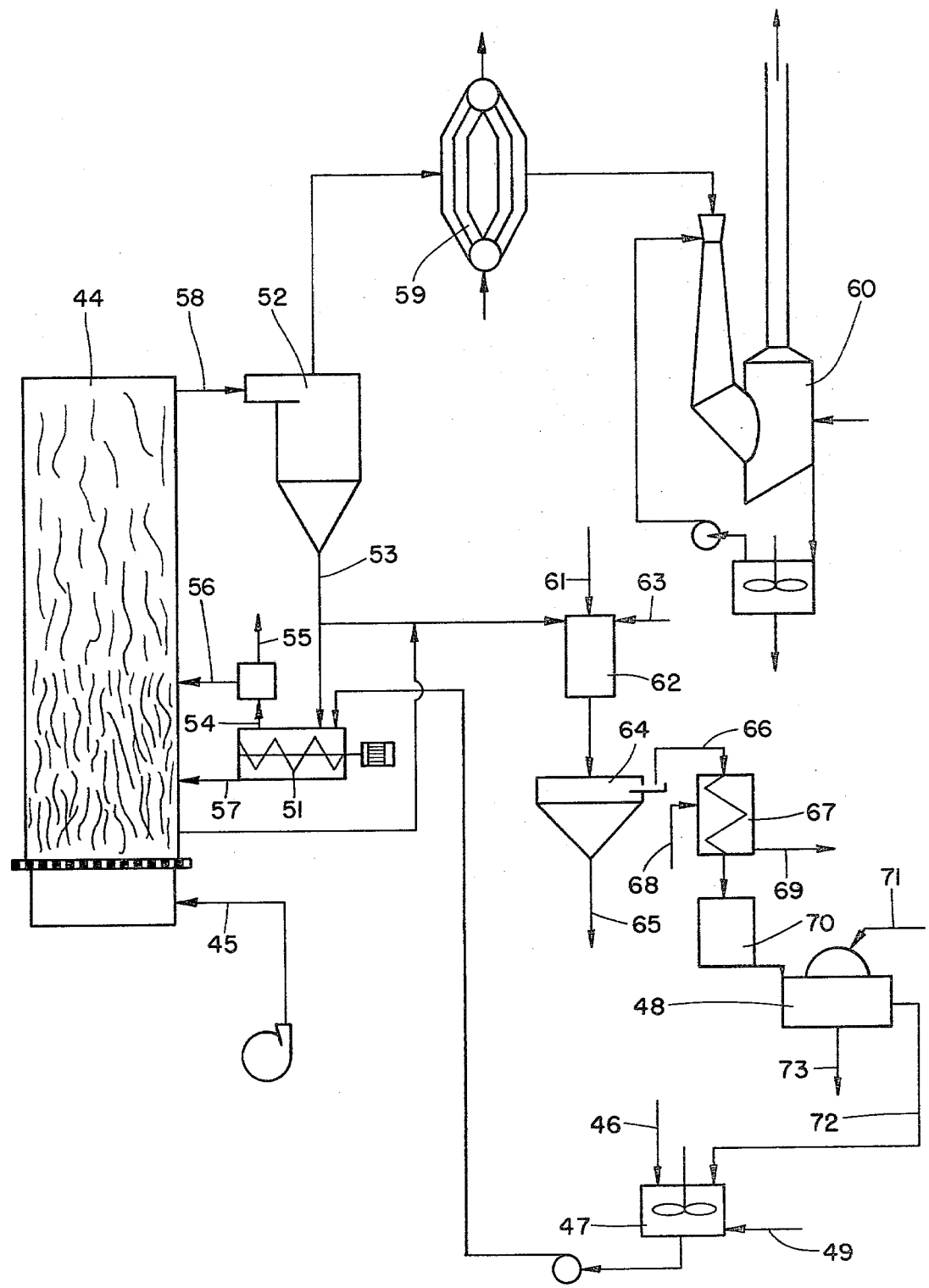
FIG. 3 is a flow sheet of the method as applied to spent liquors from a sodium-based pulping process, where sodium is recovered in the form of NaOH.

In FIG. 3 there is shown a system for the recovery of sodium, in the form of NaOH-liquid, from spent liquor coming from a sodium-based pulping process.

In FIG. 3, the numeral 44 refers to a fluidized bed reactor which is supplied with preheated air through conduit 45. The spent liquor is fed through conduit 46 to a mixer 47 into which also alumina hydrate separated in filter 48 and through conduit 49 Al-salts such as Al-$(OH)_3$ and $Al_2O_3$ as make-up chemicals are introduced. The produced sodium aluminate slurry is conveyed to a prereactor 51 through conduit 50. Into the prereactor, also a portion of the sodium aluminate-containing dust removed from the flue gases of the fluidized bed reactor is introduced through conduit 53. The gases generated in the prereactor are discharged through conduit 54 and steam can be separated from it and removed in form of condensate through conduit 55. The uncondensed gases are led to the reactor through conduit 56 to be combusted.

The dried material is introduced into the reactor through conduit 57. The gases generated in the combustion and other chemical reactions are discharged from the upper part of the reactor through conduit 58, from which the flue gases flow to a dust separator 52, a waste heat boiler 59, and a gas scrubber 60.

A portion of the sodium aluminate-containing dust removed from the flue gases by the dust separator 52 is conducted to a dissolver 62 to which water is supplied through conduit 61. The formed slurry is conducted to a sedimentation tank 64 where impurities are separated at a temperature of about 90° C. The impurities are removed through conduit 65 and aluminate liquor is fed through conduit 66 to a cooler 67. The numerals 68 and 69 refer to the inlet and outlet conduits for the cooling medium. The aluminate solution cooled to about 50° C. is conducted to an aging tank 70 where $Al(OH)_3$ precipitates in accordance with the following principal reactions:

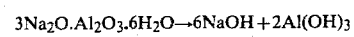

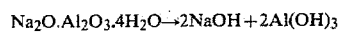

The precipitated Al(OH)$_3$ is separated in the filter 48, washed with water from conduit 71 and fed to the mixer 47 through conduit 72. The sodium chemicals are removed through conduit 73 for reuse in the digestion liquor.

Figure 4:
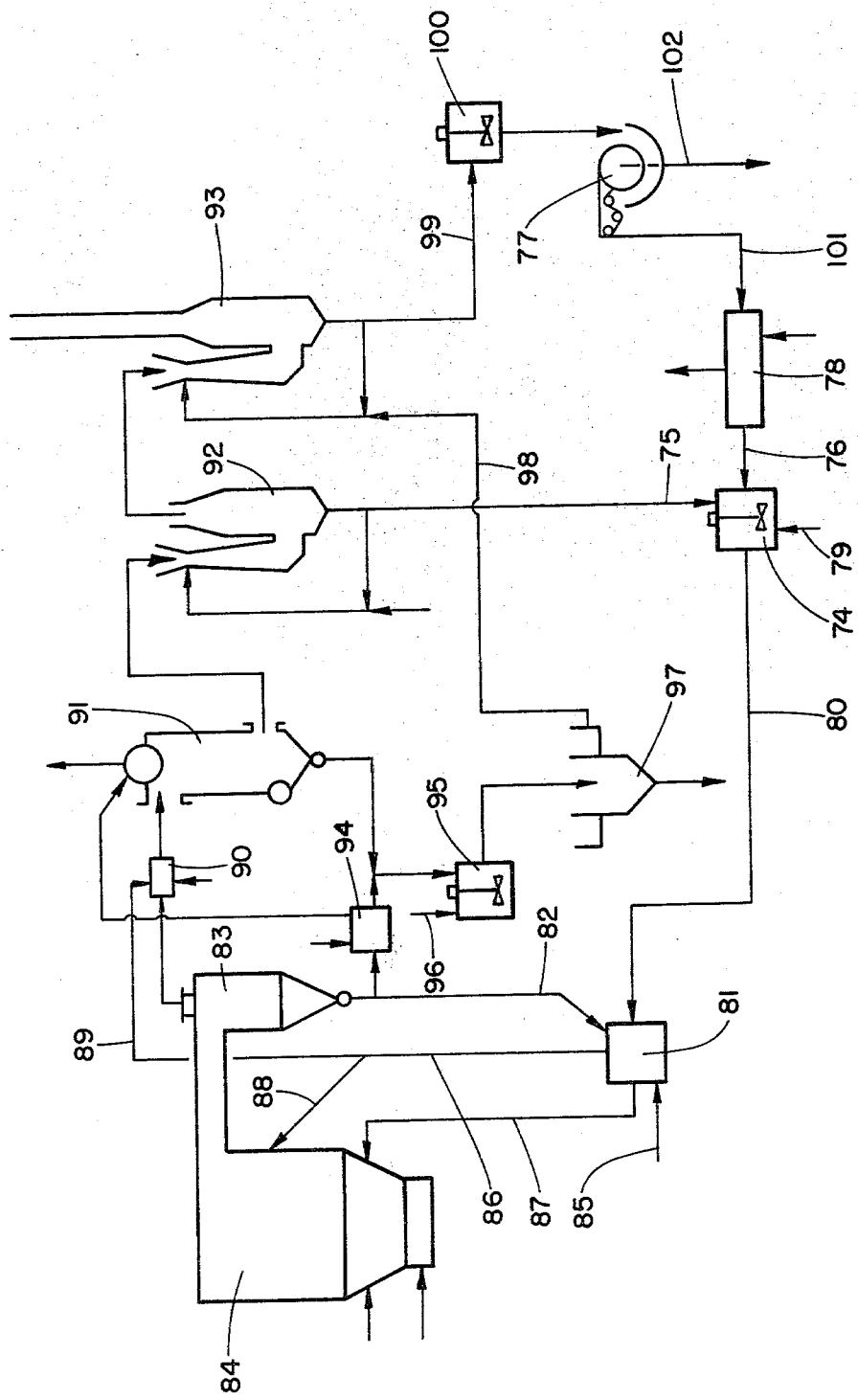
FIG. 4 is a flow sheet of the method as applied to spent liquors from a sulphite pulping process.

In FIG. 4, there is shown a system for the recovery of chemicals from spent liquor coming from a sulphite pulping process, where sodium and sulphur is recovered in the form of sodium salts such as Na$_2$SO$_3$, NaHSO$_3$, Na$_2$CO$_3$ and NaHCO$_3$ in solution.

In FIG. 4, the numeral 74 refers to a mixer into which concentrated spent liquor 75 from a sulphite pulping process is introduced. To the mixer is conveyed alumina hydrate 76 separated in a filter 77 and dried in a dryer 78. To the mixer is also delivered make-up chemicals 79, if necessary. From the mixer the spent liquor and the chemicals mixed into it are pumped through conduit 80 to a prereactor 81. To the prereactor is also conveyed sodium removed by a dust separator 83 from the flue gases coming from a fluidized bed reactor 84. In the prereactor pyrolysis of the spent liquor takes place whereby gases and steam are generated. Air 85 can also be supplied to it, in which case partial combustion takes place. The gases which contain the main part of the sulphur contained in the spent liquor, mostly in the form of hydrogen sulphide, and the steam are removed from the prereactor through conduit 86, and the solid components are introduced into the fluidized bed reactor through conduit 87. The gases and the steam generated in the prereactor and the air introduced into it bring about an effective intermixing of the spent liquor and the hot dust which can be intensified by mechanical means. The temperature in the prereactor is maintained at between 200° and 900° C. and preferably at about 700° C. The gases from the prereactor are alternatively passed through conduit 88 to the fluidized bed reactor or through conduit 89 to an after-burner 90 where they meet the flue gases exhausted from the fluidized bed reactor. The hydrogen sulphide burns to sulphur dioxide in the upper part of the fluidized bed reactor or the after-burner. The heat of the flue gases can be utilized in a waste heat boiler 91 from which they flow to gas scrubber 92 and 93.

A portion of the sodium aluminate containing dust removed from the dust separator 83 is passed through a cooler 94 to a dissolver 95 to which water 96 is supplied. After the dissolving step the difficulty soluble compounds are separated in a sedimentation tank 97 and the sodium alumina-containing solution 98 is fed to the gas scrubber 93 in which the solution is neutralized by sulphur dioxide-containing flue gases. As a result of the neutralization the alumina precipitates in the form of hydrate while the sodium salts remain in the solution in the form of Na$_2$SO$_3$, NaHSO$_3$, NaHCO$_3$, and Na$_2$CO$_3$, depending on the Na/S-ration and the pH-value.

The alumina hydrate is separated from the dissolved sodium salts in the filter 77. In order to improve the separation, the slurry 99 is first transferred to an aging tank 100 where the alumina hydrate crystallizes, before it is brought to the filter. After the separation, the alumina hydrate is returned to the process through conduit 101 to be mixed into the spent liquor. The solution containing sodium salts is removed from the filter through conduit 102 to the digester house.

Figure 5:
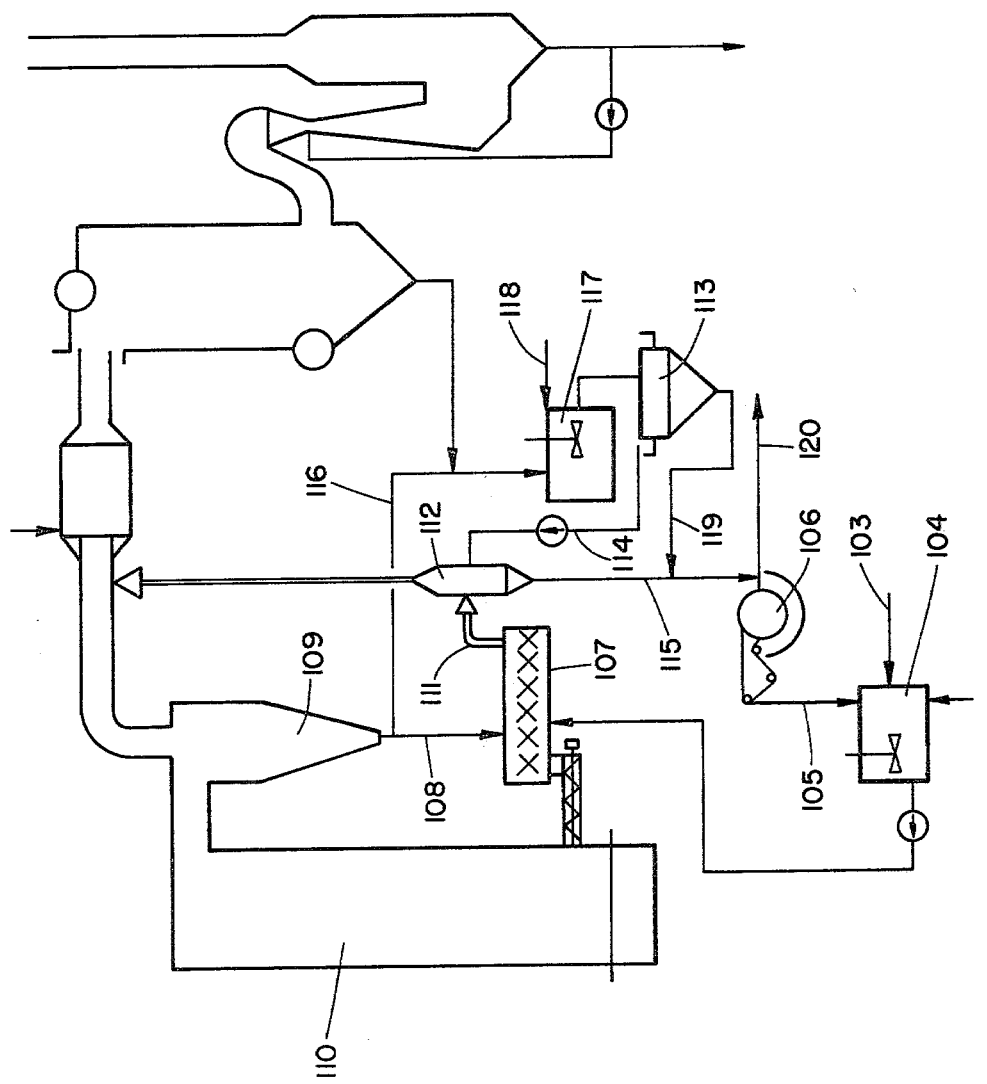
FIG. 5 is a flow sheet of the method as applied to spent liquors from a sulphate pulping process.

In FIG. 5, there is shown a system for the recovery of chemicals coming from a sulphate pulping process, where sodium and sulphur is recovered mainly in the form of NaOH and Na$_2$S in solution.

In FIG. 5, a concentrated spent liquor 103 from a sulphate pulping process is conveyed to a mixer 104. To the mixer is also fed alumina hydrate 105 separated in a filter 106. From the mixer the spent liquor and the chemicals mixed into it are pumped to a prereactor 107. To the prereactor is also conveyed sodium aluminate-containing host dust 108 removed by a dust separator 109 from the flue gases exhausted from a fluidized bed reactor 110. The pyrolysis gases generated in the prereactor which contain sulphur, mainly in the form of hydrogen sulphide, are conveyed through conduit 111 to an absorption tower 112 into which also sodium hydroxide-containing solution from a sedimentation tank 113 is conveyed through conduit 114. The hydrogen sulphide is absorbed in the absorption tower, whereby a solution, mainly containing NaOH and Na$_2$S is formed which is supplied to the filter 106 through conduit 115. A portion of the sodium aluminate-containing dust removed by the dust separator 109 is brought through conduit 116 to a dissolver 117 to which also water 118 is supplied. After the dissolving step alumina hydrate is separated by precipitation from the formed sodium hydroxide aluminate solution in the sedimentation tank 113 and brought to the filter 106 through conduit 119. In the filter alumina hydrate is removed to be returned to the process while the solution containing sodium salts is transferred to the digester house through conduit 120.

Figure 6:
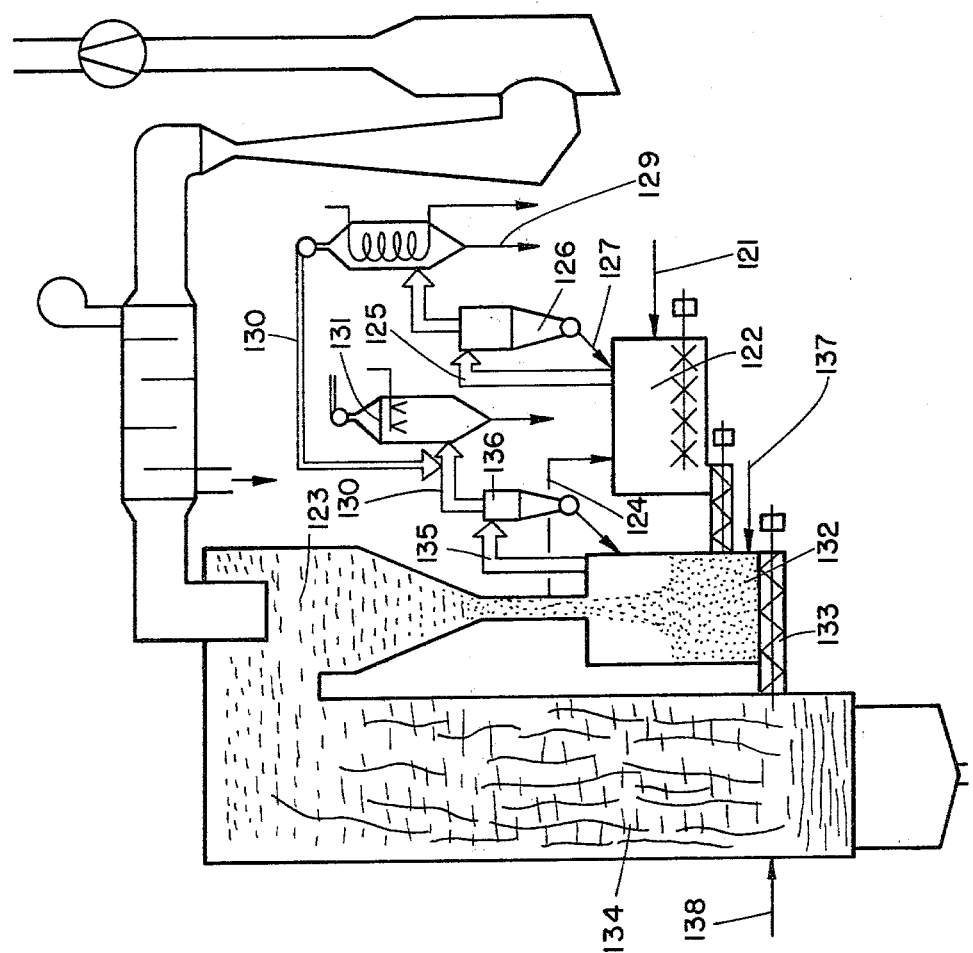
FIG. 6 is a flow sheet of the method as adapted for the thermal decomposition of organic material.

In FIG. 6, there is shown a system for the thermal decomposition of organic material to obtain raw gases containing carbon monoxide, hydrogen and hydrogen sulphide. The heat-treatment can be carried out in the presence of oxygen or without it depending on the desired gasification result and the material to be treated. The method can be applied to peat, carbon and other solid fuels, oil sand or shale and various solid waste materials. By this method, raw gases can be produced which can be used as such as combustible gases or be processed to synthetic gases for use as raw material in the chemical industry or reducing gases for metallurgical purposes.

According to the invention, the gasification process and the combustion process are separated from each other for which reason the gasification can be effected at a lower temperature than the combustion. The temperature of both processes can easily be controlled undependently of each other. The heat required for the gasification is obtained mainly indirectly from the combustion process, i.e. from the hot dust removed from the flue gases and not, as in prior known methods, directly from the combustion process.

In FIG. 6 moist material 121 is introduced into a drier-mixer 122 to which also a portion of the hot dust removed from the flue gases by a cyclon 123 is conveyed through conduit 124. In the drier-mixer the hot dust and the material to be treated are intermixed, whereby drying and preheating of the material is brought about at a temperature of about 100° C. Generated vapors are discharged from the drier-mixer through conduit 125 to a dust separator 126 from which separated solids are returned through conduit 127 to the drier-mixer. Water is condensed from the vapors in a condenser 128 and discharged from the bottom part of the condenser through conduit 129 and non-condensable gases are discharged from its upper end and passed through the conduit 130 to a gas scrubber 131. The dried and preheated material is then transferred to a prereactor 132 to which also the remaining portion of the hot dust removed from the flue gases is delivered. In the prereactor the temperature is maintained at a desired value in the range of 400° to 1000° C. by controlling the rate of the incoming and discharged quantities. The material is pyrolized in the prereactor and the carbonization residue is introduced through conduit 133 into a fluidized bed reactor 134 where its combustible components are burned under oxidizing conditions in a manner known per se. The pyrolysis gases are discharged from the prereactor through conduit 135 to a dust separator 136 and then passed to the gas scrubber 131. Air, steam and other gases can be introduced into the prereactor through conduit 137.

If the heat value of the material introduced into the fluidized bed reactor is insufficient for maintaining a combustion temperature of between 600° and 1000° C., auxiliary fuel can be supplied to it through conduit 138.

Figure 7:
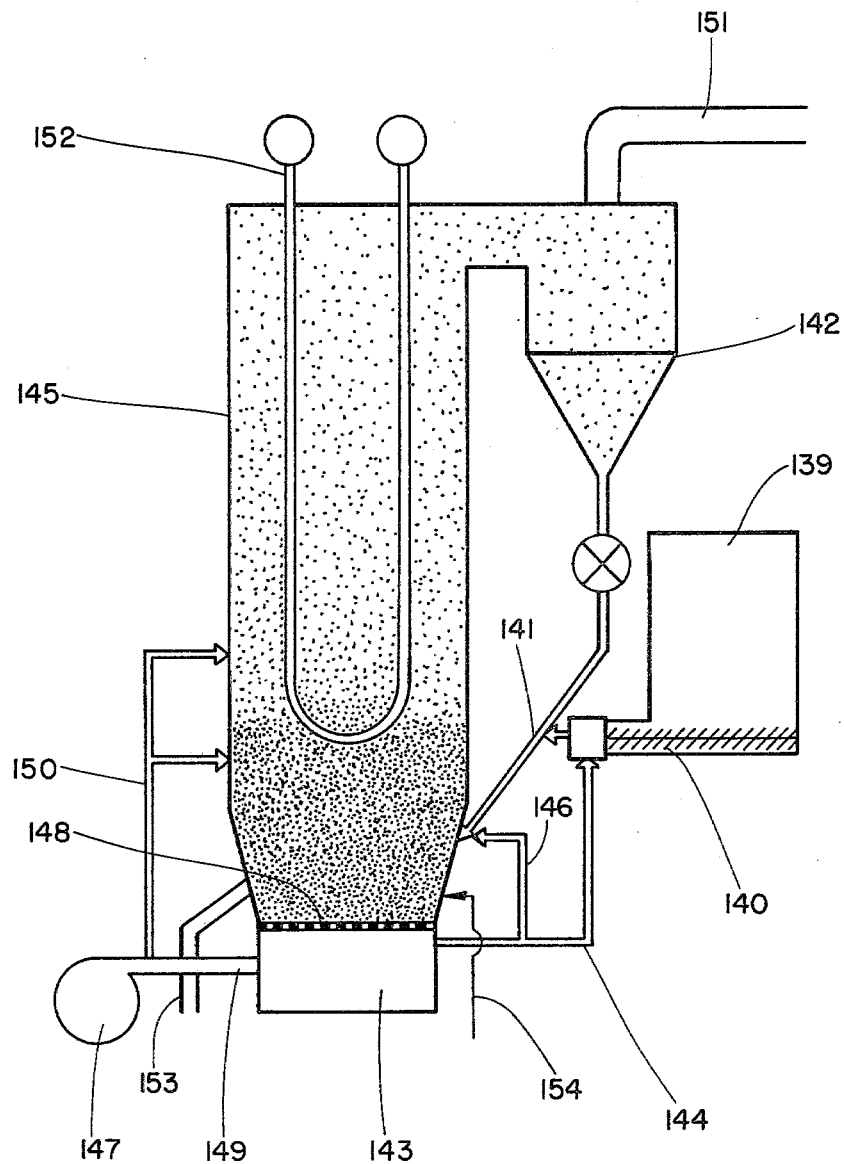
FIG. 7 is a flow sheet of the method of this invention applied to the combustion of coal and the calcination of calcium carbonate.

FIG. 7 illustrates two embodiments of the invention in which no gases, nor liquids nor solids are generated when the material is mixed with the recycled hot particles. The material may be supplied into the hopper 139 either totally dry or partially dry. From the hopper the material is fed by means of screw feeder 140 into standpipe 141 of cyclone 142. In the standpipe the material is mixed with the recirculated hot particles. Air is introduced into the standpipe from windbox 143 through conduit 144. The gas-solid mixture is then transferred into reactor 145. Primary air is supplied into the reactor through conduit 149 and secondary air through conduit 150.

The invention is further illustrated by some examples:

EXAMPLE 1

Incineration of sewage sludge (FIG. 1)
Solids content of the sludge 20%
Dust content calculated on the total solids 30%
Calorimetric heat value 16 MJ/kg of total solids
Temperature of the preheated air 500° C.

Dust at a temperature of 800° C. removed from the flue gases was mixed into the sludge and supplied to the fluidized bed reactor at a temperature of 100° C.

| | | |
|---|---|---|
| Quantity of dust mixed into the sludge | Kg/Kg solid content | 13,7 |
| Energy requirement | KJ/kgKA | 1440 |
| Excess air | % | 30 |
| Quantity of flue gases | Kg/Kg solid content | 8,75 |
| Composition of the flue gases | | |
| $O_2$ | % | 4,5 |
| $CO_2$ | % | 12,0 |
| $N_2$ | % | 72,7 |
| $H_2O$ | % | 10,8 |
| Input energy | | |
| auxiliary energy | % | 6,5 |
| sludge | % | 73,5 |
| air | % | 20,0 |
| Output energy | | |
| flue gases from the reactor | % | 45,9 |
| steam from the prereactor | % | 47,7 |
| dust in the flue gases | % | 1,2 |
| heat losses | % | 5,2 |

As appears from the example, the combustion is almost autogenous when in accordance with the invention water is removed from the sludge before it is fed to the reactor.

EXAMPLE 2

Treatment of spent liquor from a sodium-based pulping process and recovery of sodium in the form of $Na_2CO_3$ (FIG. 2) 1.24 kg/s spent liquor, having a solids content of about 45%, was fed to the mixer to which 0.2 kg/s alumina hydrate was supplied. The alumina spent liquor mixture was fed to the prereactor to which 5.8 kg/s sodium aluminate dust from the heat boiler was added. About 0.53 kg/s water evaporated and the dried alumina spent liquor together with the recycled ash was supplied to the fluidized bed reactor. The combustion took place at a temperature of about 1000° C. The sodium alumina compounds converted to sodium aluminate, the main part of which was removed from the fluidized bed reactor with the flue gases.

A portion of the sodium aluminate, i.e. 0.2 kg/s was conveyed to the dissolver where neutralization was effected by the flue gases, whereby a $Na_2CO_3$-solution was produced. Precipitation of $Al(OH)_3$ was brought about in the aging tank, alumina hydrate was then separated in the filter, and 0.22 kg/s sodium carbonate solution was used for the preparation of digestion liquor. 0.8 kg/s water was supplied to the gas scrubber.

EXAMPLE 3

Treatment of spent liquor from a sulphite pulping process and recovery of sodium and sulphur in the form of $Na_2SO_3$ and $Na_2CO_3$ (FIG. 4) 24 kg/s spent liquor, having a solids content of 8%, was concentrated to a solids content of 36% by a thermo compressor evaporation process and then concentrated to a solids content of 60% in a flue gas scrubber. Into the concentrated spent liquor 0.60 kg/s $Al_2O_3$ was mixed, corresponding to a mol ratio $Na_2O/Al_2O_3 = 1$ in the mixture. The mixture was pyrolyzed in the prereactor at a temperature of about 700° C. The temperature was controlled by varying the quantity of the supplied hot dust removed from the flue gases. Partial combustion was brought about by blowing air into the prereactor. The spent liquor which contained Na-Al-salts and uncombusted carbon was introduced into a fluidized bed reactor where the Na-Al-salts were converted into sodium aluminate at a temperature above 900° C. The gases containing sulphur, mainly in the form of $H_2S$, uncombusted gas components such as $H_2$ and CO, inert components such as $CO_2$, $H_2O$ and $N_2$ were conveyed from the prereactor to the fluidized bed reactor or burner. Air and oil were supplied to the fluidized bed reactor. The combustion in the reactor was mildly reducing and the flue gases had the following composition:

$O_2 = 1.3\%$, $CO_2 = 16.6\%$, $N_2 = 76\%$, $CO = 1.3\%$, $CH_4 = 0.4\%$, $H_2 = 1.4\%$, $H_2S = 1.3\%$

The after-burner of the flue gases was performed by adding 3.4 kg/s air, whereby $H_2S$ was converted into $SO_2$. Heat recovery was carried out in a waste heat boiler in which the temperature of the flue gases was reduced from 1100° C. to 400° C. The flue gases was then passed to a Venturi scrubber to concentrate the spent liquor and then to a second gas scrubber to absorb $SO_2$ in an alkaline sodium aluminate solution. The sodium aluminate solution was formed by dissolving 1 kg/s dust removed from the flue gases in 5 kg/s water. When $SO_2$ and $CO_2$ were absorbed in the water, Al-$(OH)_3$ precipitated, which was removed from the solution. The remaining solution, the concentration of which could be controlled by varying the quantity of the washing water supplied to the filter, which in this case was 5 kg/s, contained 106 g/l $Na_2SO_3$
38 g/l $Na_2CO_3$ and could be used as such in the digestion liquor. The $Al(OH)_3$ was mixed into the concentrated spent liquor.

EXAMPLE 4

Treatment of spent liquor from a sulphate pulping process and recovery of chemicals in the form of NaOH and $Na_2S$ (FIG. 5).

Into 2.2 kg/s concentrated spent liquor, having a solids content of 65%, 0.9 kg/s $Al(OH)_3$, containing 0.7 kg/s water was mixed. To the mixture was added dust in a prereactor, having a temperature of about 1000° C., removed from the flue gases of a fluidized bed reactor, whereby a pyrolysis was brought about at a temperature between 300° and 900° C. As a result of the pyrolysis sulphur in the spent liquor converted mainly into hydrogen sulphide which was absorbed in a solution containing sodium hydroxide and sodium aluminate. The sodium hydroxide aluminate solution was formed by dissolving 0.9 kg/s sodium aluminate removed from the flue gases in the dust separator and the waste heat boiler. Before the absorption of $H_2S$, 0.9 kg/s precipitated $Al(OH)_3$ was removed and returned to the process. The remaining solution which contained 2.9 mol/s sulphur and 5.7 mol/s sodium, mainly in the form of NaOH and $Na_2S$, was used as a digestion liquor.

By the method according to the invention it is possible to reduce the sulphur in spent liquors under easily controllable conditions before the combustion of the spent liquors. The pulping chemicals are recovered in such a form that they can be used as such in the digestion liquor. Depending on the pH-value of the removed solution they can also appear in other forms as those described in the examples. It has been experimentally varified that the sodium aluminate remaining in the solution has no detrimental effects on the pulping process.

EXAMPLE 5

Pyrolysis of peat (FIG. 6)

15 g/s peat, having a solids content of 60%, was dried in a drier-mixer to a solids content of about 99%. From the drier-mixer 6 g/s water in the form of steam was withdrawn to the condenser. 28 g/s dust removed from the flue gases, having a temperature of about 900° C., was used for the drying. The dried peat together with the dust was introduced into the prereactor where the pyrolysis was brought about at a temperature of about 700° C. by using 26 g/s dust. Steam was used as a gasification means. The cleaned pyrolysis gas contained $CO_2$ = 8%
$C_nH_m$ = 3%
$O_2$ = 0.5%
CO = 30%
$H_2$ = 44%
$CH_4$ = 4%
$H_2S$ = 0.14%
$H_2O$ = 10.14%

Its heat value was 13.1 $MJ/m^3$. The carbonization residue was burned in the fluidized bed reactor at a temperature of about 900° C.

EXAMPLE 6

Combustion of coal (FIG. 7)

50 g/s of coal having a moisture content of about 10% is fed from the hopper 139 by the screw feeder 140 into the standpipe 141 of the cyclone 142. In the standpipe a thorough mixing takes place between the coal and the recirculated fine hot solids. The water of the coal is evaporated and the gasification of the coal starts. The mixing between the coal and the recirculated solids is further promoted by introducing 10 gls of air from the windbox 143 into the standpipe through the conduit 144. The gas/solids mixture is pneumatically transported into the reactor 145. The injection of the mixture is further intensified by introducing 20 g/s of air into the gas/solids mixture through the conduit 146. The combustion of the predried and partly gasified coal starts immediately in the lower part of the reactor where 300 g/s of primary air from the fan 147 through the air distributor 148 and the conduit 149. The combustion is completed at 900° C. by means of 120 g/s of secondary air supplied through the pipe 150. Approximately 1000 g/s of fine solids is separated in the cyclone and 590 g/s of fine gases leaves the cyclone through pipe 151 for heat recovery. 550 kW of heat is recovered in form of steam in the cooling tube 152.

EXAMPLE 7

Calcining of calciumcarbonate (FIG. 7)

12.0 g/s of calciumcarbonate ($CaCO_3$) is fed from the hopper 139 by the screw feeder 140 into the standpipe 141 of the cyclone 142. In the standpipe a thorough mixing takes place between the feed material and recirculated calciumoxide (CaO). The mixing between recirculated CaO and the feed is promoted by introducing 5 g/s of air from the windbox 143 into the standpipe through the conduit 144. The gas/solids mixture is pneumatically transported into the reactor 145. The injection of the mixture is further intensified by introducing 10 g/s of air into the gas/solids mixture through the conduit 146. The calcining of the preheated $CaCO_3$ takes place in the reactor. 6.5 g/s of CaO is discharged through the pipe 153. The calcining takes place at a temperature of 900° C. by introducing 1.6 g/s oil through the pipe 154. Combustion takes place in two stages by supplying 20 g/s of primary air through the grid 148 and 10 g/s of secondary air through the conduit 150. Approximately 160 g/s of fine solids is separated in the cyclone and recirculated.

What is claimed is:

1. An apparatus for heat treatment of a material in a fluidized bed which consists essentially of:
   (1) means defining a single fluidized bed reactor in which the heat treatment of said material is carried out;
   (2) a prereactor, of the non-fluidized bed type, for preheating the material to be subjected to said heat treatment;
   (3) means for transferring the preheated material from the prereactor to the lower part of the reactor;
   (4) first inlet means for air located in the bottom part of the reactor;
   (5) at least one second inlet means for secondary air located at the level above said first inlet means for said air;
   (6) outlet means located in the upper part of the reactor for removal of the flue gases generated in the reactor, which flue gases contain entrained solid particles;

(7) separating means to separate the solid particles entrained in said flue gases;

(8) conduit means for recirculating said solid particles into the prereactor and for mixing said solid particles with the material to be subjected to said heat treatment;

(9) means for introducing a gas into the prereactor;

(10) means for the removal of vapors from the prereactor and

(11) means for introducing said vapors into the upper part of the reactor.

2. An apparatus for heat treatment of a material in a fluidized bed which comprises:

(1) means defining a single fluidized bed reactor in which the heat treatment of said material is carried out;

(2) a prereactor for preheating the material to be subjected to said heat treatment;

(3) means for transferring the preheated material from the prereactor to the lower part of the reactor;

(4) first inlet means for air located in the bottom part of the reactor;

(5) at least one second inlet means for secondary air located at the level above said first inlet means for said air;

(6) outlet means located in the upper part of the reactor for removal of the flue gases generated in the reactor, which flue gases contained entrained solid particles;

(7) separating means to separate the solid particles entrained in said flue gases;

(8) conduit means for recirculating said solid particles into the prereactor and for mixing said solid particles with the material to be subjected to said heat treatment;

(9) means for introducing a gas into the prereactor;

(10) means for the removal of vapors from the prereactor;

(11) means for introducing said vapors into the upper part of the reactor, wherein the prereactor is provided with third inlet means for the introduction of make-up chemicals into the prereactor and wherein the apparatus is provided with a mixer for mixing the material to be subjected to said heat treatments with make-up chemicals, said mixer being located upstream of the prereactor.

* * * * *